United States Patent [19]
Becker

[11] Patent Number: 5,752,536
[45] Date of Patent: May 19, 1998

[54] LOCKING MECHANISM FOR SLIDE-OUT ROOM COVER

[75] Inventor: Kent Becker, Huntertown, Ind.

[73] Assignee: White Consolidated Industries, Inc., Cleveland, Ohio

[21] Appl. No.: 812,685

[22] Filed: Mar. 6, 1997

[51] Int. Cl.⁶ .................... E04F 10/06; E04B 1/343
[52] U.S. Cl. ............... 135/88.1; 135/88.01; 135/88.12; 135/903; 160/67; 296/26; 296/171; 52/67
[58] Field of Search ................ 135/88.1, 88.11, 135/88.12, 903, 88.01; 52/67, 73, 74; 296/163, 165, 171, 26; 160/67

[56] References Cited

U.S. PATENT DOCUMENTS

| | | | |
|---|---|---|---|
| 2,948,288 | 8/1960 | Nelson | 135/88.1 |
| 3,870,096 | 3/1975 | Horrell | |
| 3,918,511 | 11/1975 | Upton, Jr. | 135/903 X |
| 4,020,888 | 5/1977 | Upton et al. | 135/903 X |
| 4,188,964 | 2/1980 | Greer | 135/903 X |
| 4,524,791 | 6/1985 | Greer | 135/88.12 |
| 4,576,192 | 3/1986 | Duda | |
| 4,607,654 | 8/1986 | Duda | 135/903 X |
| 4,658,877 | 4/1987 | Quinn | 160/67 X |
| 4,705,148 | 11/1987 | Zindler | |
| 4,719,954 | 1/1988 | Curtis et al. | |
| 4,759,396 | 7/1988 | Quinn | |
| 4,770,223 | 9/1988 | Ouellette | |
| 4,930,837 | 6/1990 | Marsh et al. | |
| 4,955,661 | 9/1990 | Mattice | 296/26 X |
| 5,171,056 | 12/1992 | Faludy et al. | |
| 5,237,782 | 8/1993 | Cooper | 52/67 |
| 5,280,687 | 1/1994 | Boiteau | |

*Primary Examiner*—Wynn E. Wood
*Attorney, Agent, or Firm*—Pearne, Gordon, McCoy and Granger

[57] ABSTRACT

A retractable awning for a recreational vehicle slide-out which prevents rain, snow and other debris from collecting on the roof of the slide-out. The awning is provided with an inner edge secured to the adjacent wall of the recreational vehicle immediately above the slide-out roof. The opposite edge of the awning is connected to a roller journaled on arms pivotally mounted on the outer face of the slide-out. A locking mechanism automatically prevents rotation of the roller when the slide-out is in a retracted position to prevent billowing of the awning when the recreational vehicle travels and automatically allows rotation of the roller when the slide-out moves away from the retracted position to wind and unwind the awning onto the roller. The lock mechanism includes a lock arm which blocks rotation of the roller only when the slide-out is in the retracted position so that no operations or manipulations are required by the operator to lock or unlock the lock mechanism.

20 Claims, 4 Drawing Sheets

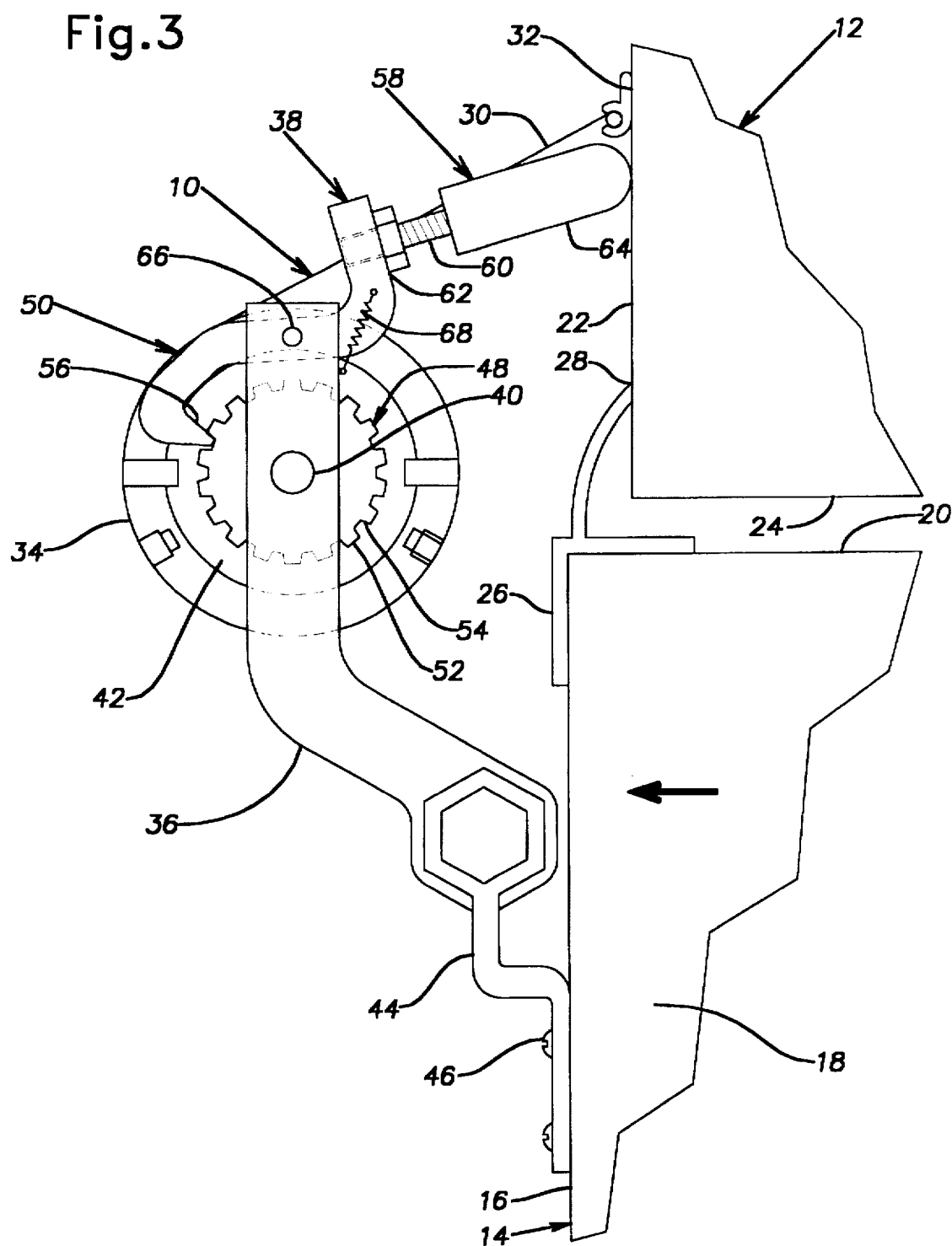

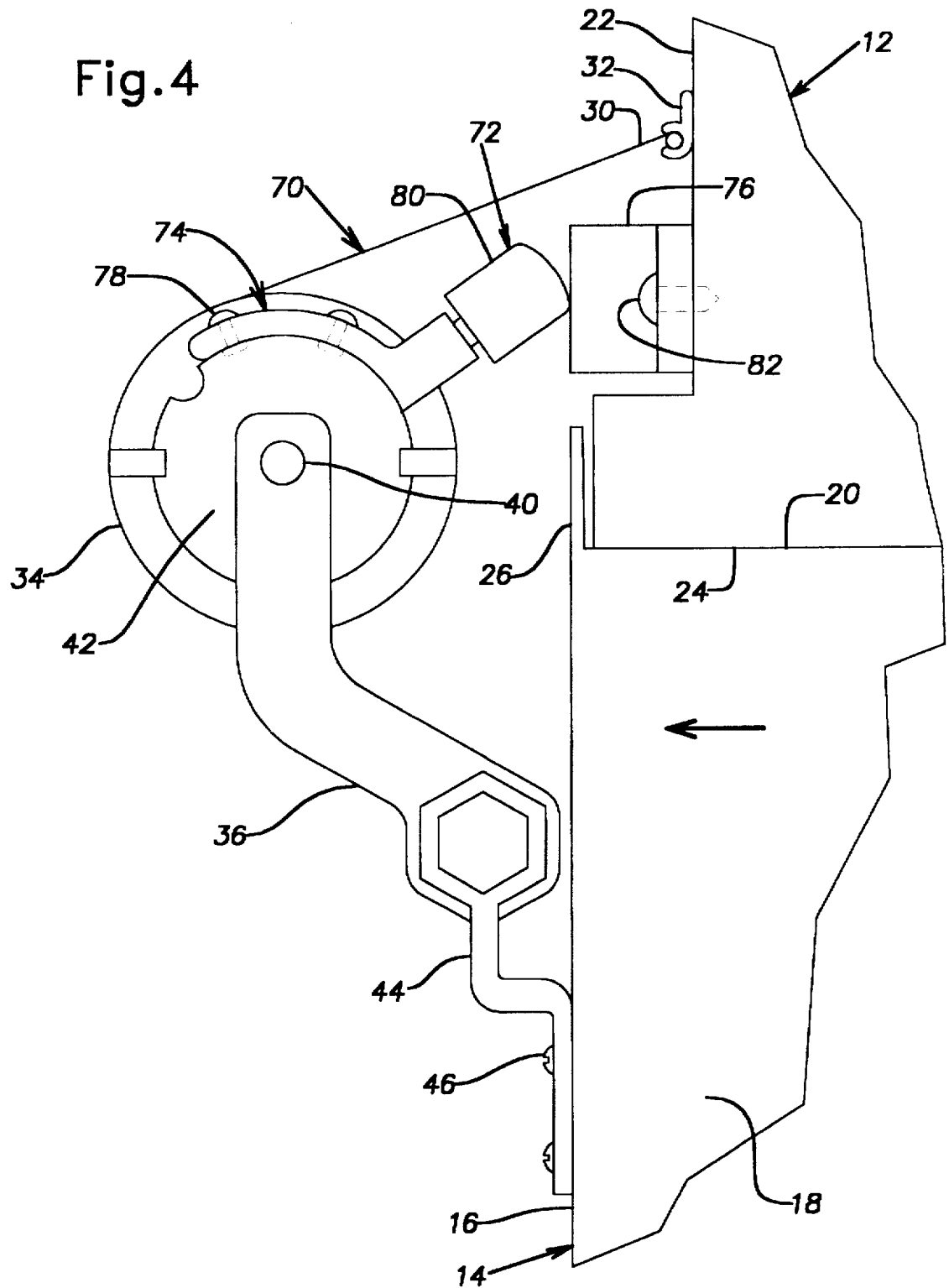

LOCKING MECHANISM FOR SLIDE-OUT ROOM COVER

BACKGROUND OF THE INVENTION

The present invention generally relates to retractable awnings, and more particularly, to retractable awnings for use with recreational vehicles and the like having retractable slide-out portions.

Some recreational vehicles are provided with a retractable structure usually referred to as a "tip-out" portion. The tip-out portion pivots into the vehicle for road travel and pivots out of the vehicle for use when parking. The tip-out portion enables the recreational vehicle to have an exterior width which meets road restrictions during transportation and an interior width which provides a comfortable interior layout during use. See U.S. Pat. No. 4,312,159 for an example of a recreational vehicle with a tip-out portion.

In order to obtain even larger interior widths, some recreational vehicles are, provided with a retractable structure usually referred to as a "slide-out" portion. Such slide-out portions are generally rectangularly-shaped and movable between an extended position and a retracted position. When the slide-out portion is in the extended position, the slide-out portion perpendicularly extends from the side wall of the recreational vehicle with an outer wall of the slide-out portion generally parallel and spaced apart from the side wall of the recreational vehicle. When the slide-out portion is in the retracted position, the slide-out portion is located within the interior of the recreational vehicle with the outer wall of the slide-out portion generally coplanar with or adjacent the side wall of the recreational vehicle. See U.S. Pat. No. 4,500,132 for an example of a recreational vehicle with a slide-out portion.

The roof of the slide-out portion is typically a flat surface and substantially parallel to the roof of the recreational vehicle. One problem is that rain, snow, leaves, dirt, and other debris tends to collect on the flat roof of the slide-out portion while the slide-out room is in the extended position. The debris is then brought into the interior of the recreational vehicle when the slide-out portion is retracted into the interior of the recreational vehicle. Seals are provided to resist the movement of the debris into the interior of the recreational vehicle but are not entirely effective.

One solution to prevent entry of debris has been to mount a retractable awning over the roof of the slide-out portion which covers the slide-out portion when the slide-out portion is in the extended position. The intention of the awning is to cause any rain, snow, leaves dirt, and other debris to collect on the awning rather than on the roof of the slide-out portion. The retractable awning is structured so that as the slide-out portion is moved to the retracted position, the awning automatically rolls onto a roller journaled at the outer surface of the slide-out portion and the debris falls harmlessly onto the ground. As the slide-out portion is moved to the extended position, the awning automatically unrolls from the roller to cover the slide-out portion. See U.S. Pat. Nos. 5,171,056 and 5,280,687 for examples of retractable awnings which cover slide-out portions of recreational vehicles.

Although the retractable awning provides adequate protection of the slide-out portion from debris, the awning may billow or unfurl due to air currents when the recreational vehicle is in transit. Some retractable awnings have incorporated various locking mechanisms which prevent either retraction or extension of the awning by preventing rotation of the roller. These locking mechanisms, however, must be manually locked and unlocked. The same problem occurs, therefore, if the operator forgets or fails to correctly lock the awning. Accordingly, there is a need in the art for a slide-out awning having an automatic locking mechanism.

BRIEF SUMMARY OF THE INVENTION

The present invention provides a retractable awning for a recreational vehicle having a slide-out which overcomes at least some of the above-noted problems. According to the present invention, the retractable awning assembly includes a roller having ends and a pair of support arms rotatably supporting the ends of the roller. Each support arm includes a support bracket adapted to be mounted to the side wall of the slide-out. A flexible awning has an inner edge adapted to be mounted on the vehicle side wall above the slide-out and an outer edge connected to the roller. A locking mechanism includes a lock arm adapted to automatically block rotation of the roller in at least one direction, the direction which unwinds the awning from the roller, when the slide out is in the retracted position.

In a preferred embodiment of the present invention, the locking mechanism also includes a locking disk connected to the roller and rotatable with the roller. The lock arm is pivotable between a locked position in which the lock arm engages the lock disk to block rotation of the lock disk and the roller and an unlocked position in which the lock arm is disengaged from the lock disk to allow rotation of the lock disk and the roller. The lock arm engages the vehicle side wall when the slide-out is in the retracted position to pivot the lock arm to the locked position. A bias member preferably urges the lock arm to the unlocked position.

In another preferred embodiment, the lock arm is connected to the roller and is rotatable therewith. The lock mechanism also includes a bumper block adapted to be mounted to the vehicle side wall and block rotation of the lock arm when the slide-out is in the retracted position. When the slide-out is moved from the retracted position, the lock arm is free to rotate without engaging the bumper block.

BRIEF DESCRIPTION OF THE SEVERAL VIEWS OF THE DRAWING

These and further features of the present invention will be apparent with reference to the following description and drawings, wherein:

FIG. 3 is an enlarged fragmentary side elevational view in the area of a roller of the retractable awning of FIG. 2, wherein the slide-out and the retractable awning are each in a retracted position; and FIG. 4 is a side elevational view similar to FIG. 3 but showing an alternative embodiment of the present invention.

DETAILED DESCRIPTION OF THE INVENTION

Figure 1:
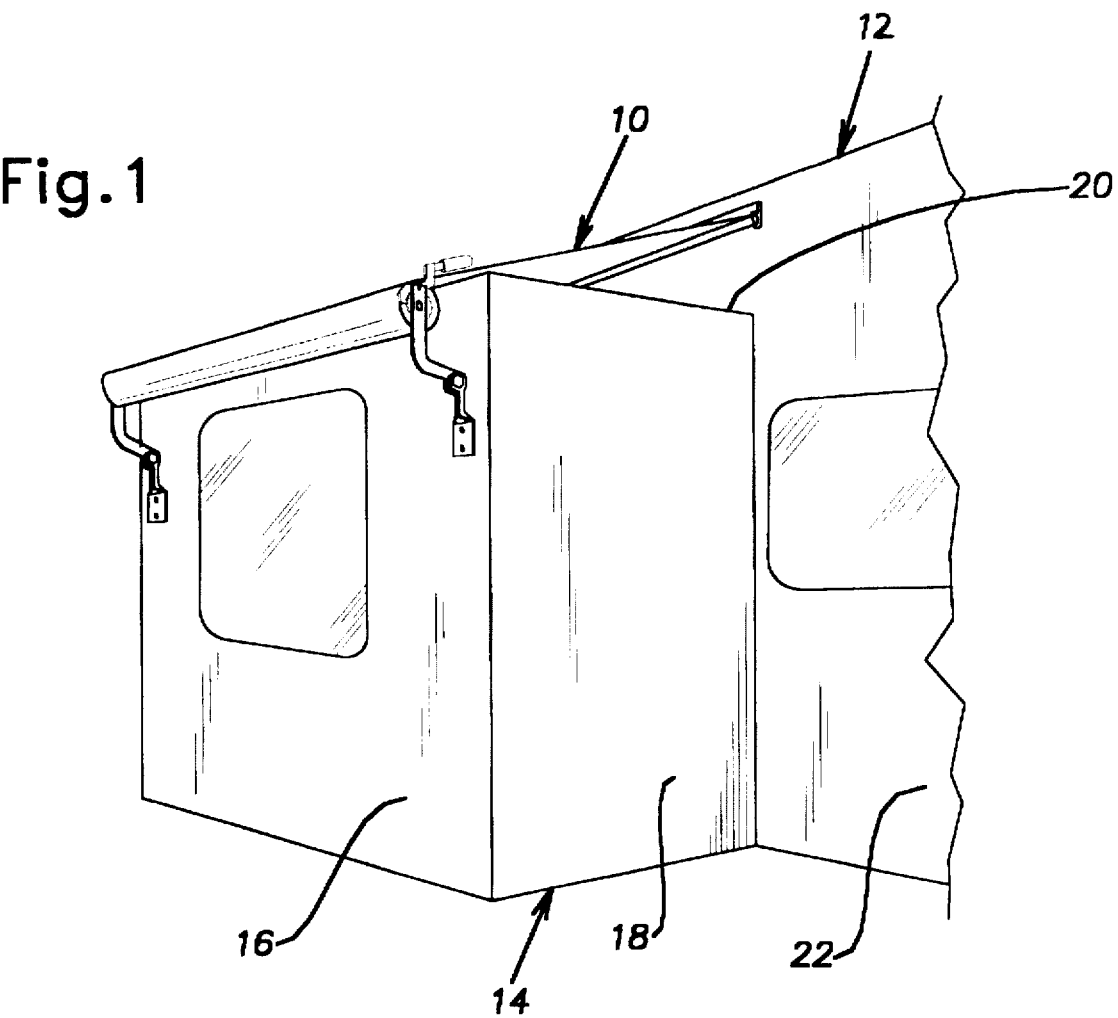
FIG. 1 is a fragmentary perspective view of a slide-out with a retractable awning according to the present invention, wherein the slide-out and the retractable awning are each in an extended position.

FIG. 1 illustrates a retractable awning assembly 10, in accordance with a preferred embodiment of the present invention, installed on recreational vehicle 12 having a movable portion or slide-out room 14. It should be understood that, as used herein, the term recreational vehicle is intended to include any vehicle which has a restricted width because it is transported, at least on occasion, along roadways. For example, it is intended that the term recreational vehicle includes mobile homes which are transported along a roadway to a site they are generally permanently installed, as well as typical travel trailers of all types, and motor homes of all types.

Figure 2:
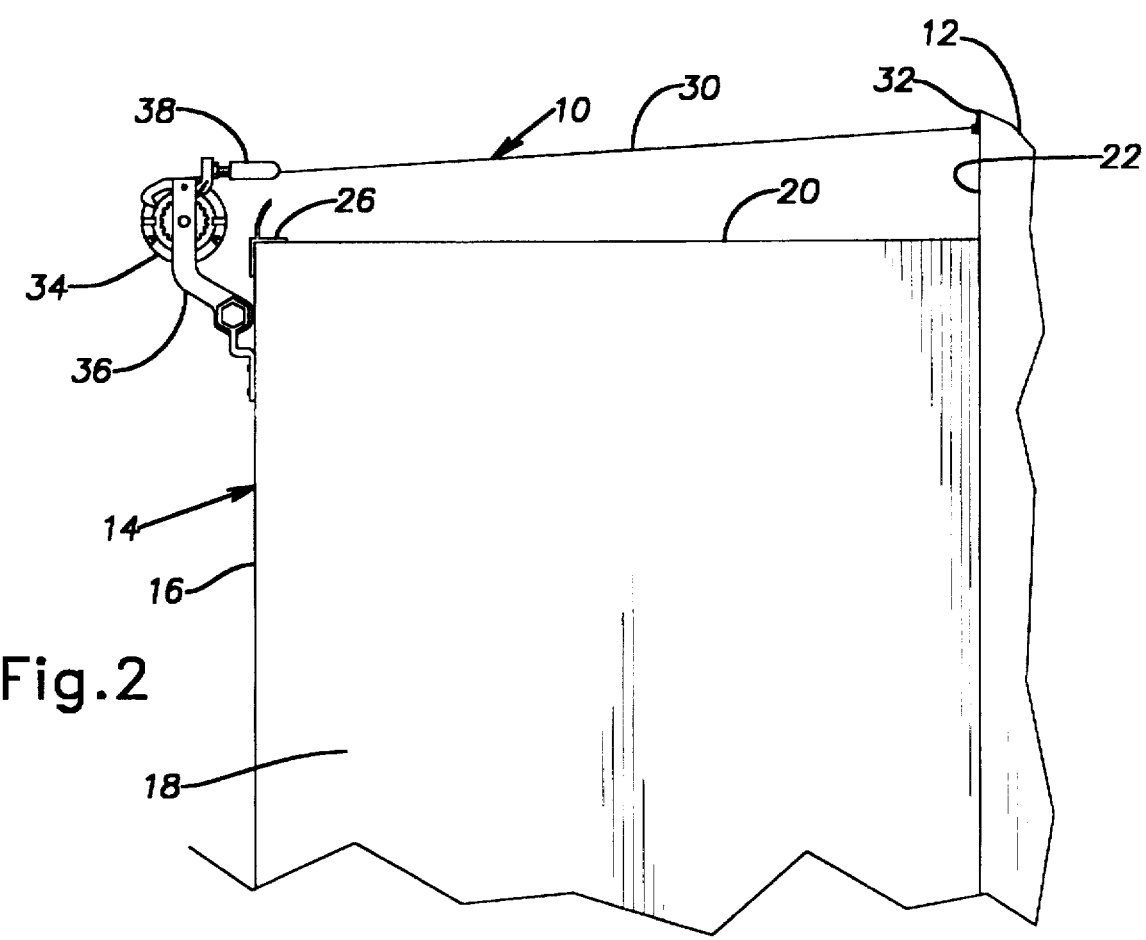
FIG. 2 is a fragmentary side elevational view of the slide-out and the retractable awning of FIG. 1.

The illustrated slide-out room 14 is generally rectangular or box-like in shape having an outer or side wall 16, and a pair of end walls 18. In addition, the slide-out room 14 has a generally flat, horizontally extending roof 20 and a floor (not specifically illustrated in the drawings). The slide-out room 14 is moveable between an extended position (best illustrated in FIGS. 1 and 2) in which it laterally projects from a side wall 22 of the recreational vehicle 12 and a retracted position (best illustrated in FIG. 3) in which it extends into the recreational vehicle 12 with the side wall 16 of the slide-out room 14 near the side wall 22 of the recreational vehicle 12. In the illustrated embodiment, the side wall 16 of the slide-out room 14 is substantially co-planer with the side wall 22 of the recreational vehicle 12 when the slide-out room 14 is in the retracted position. In the retracted position, the remainder of the slide-out room 14 extends through an opening 24 in the side wall 22 of the recreational vehicle 12 and into the interior of the recreational vehicle 12 so that the total width of the recreational vehicle 12 is within the limits normally required. Recreational vehicles 12 typically have a width of about eight feet.

With the slide-out room 14 in the retracted position, the recreational vehicle 12 can travel on roadways to a desired location. Once the recreational vehicle 12 reaches the location where it is to be used, the slide-out room 14 is moved to the extended position which increases the interior space of the recreational vehicle 12 by increasing the width of the interior along at least a portion of the recreational vehicle length. In the extended position, the end walls 18 of the slide-out room 14 space the side wall 16 of the slide-out room 14 from the side wall 22 of the recreational vehicle 12. Typically, furniture is mounted within the slide-out room 14 which is carried out beyond the unextended interior of the recreational vehicle 12 when the slide-out room 14 is extended.

In effect, the slide-out room 14 permits the recreational vehicle 12 to be narrowed when road traveling and allows the interior space of the recreational vehicle 12 to be widened when not traveling. Even relatively small increases in the width of the recreational vehicle 12 greatly improve the potential interior furniture arrangements which can be provided.

Typically, the slide-out room 14 is provided with a border or flange 26 which extends along the plane of the side wall 16 beyond the end walls 18, roof 20, and floor of the slide-out room 14. This flange 26 not only provides a degree of trim for the slide-out 14, but also provides a seal 28 with the side wall 22 of the recreational vehicle 12 around the opening 24 in the side wall 22. This seal 28 is required to prevent the entry of rain or snow when the slide-out room 14 is in the retracted position or travel condition.

In order to prevent snow, leaves, water, or other debris from collecting on the roof 20 of the slide-out room 14 when it is in the extended position, the awning assembly 10 covers the roof 20 of the slide-out room 14. The illustrated retractable awning assembly 10 includes a flexible awning 30, a mounting rail 32, a roller 34, a pair of support arms 36, and an automatic locking mechanism 38.

The flexible awning 30 may be plastic, fabric or, any other suitable material. Preferably, an inner edge of the flexible awning 30 forms a loop throughwhich a rod projects in a known manner. In a like manner, an outer edge of the flexible awning 30 preferably forms a loop throughwhich a rod projects. The flexible awning 30 extends between the mounting rail 32 and the roller 34. The inner edge of the flexible awning 30 is secured to the mounting rail 32 and the outer edge of the flexible awning 30 is secured to the roller 34.

The mounting rail 32 is attached to the side wall 22 of the recreational vehicle 12 above the slide-out room 14 with suitable fasteners. The mounting rail 32 is preferably an extrusion having a generally C-shaped cross-section. The rod and loop at the inner edge of the flexible awning 30 extend through, and are locked within, the C-shaped section of the mounting rail 32 to secure the inner edge of the flexible awning 30 to the mounting rail 32 and therefore to the side wall 22 of the recreational vehicle 12.

The roller 34 is provided with a longitudinally extending groove in the usual manner. The loop and rod at the outer edge of the flexible awning 30 extend into the groove to secure the outer edge of the flexible awning 30 to the roller 34.

The roller 34 is rotatably supported on an axle member or torsion rod 40. The rod 40 longitudinally extends through the center of the roller 34 and through end caps 42 disposed at ends of the roller 34. The end caps 42 close open ends of the roller 34, which is preferably a hollow tube, and have a central opening for passage of the rod 40 therethrough. The end caps 42 are secured to the roller 34 and rotate therewith. Preferably, idler bearings (not shown) are mounted on the rod 40 within the roller 34 and support the roller 34 for rotation of the roller 34 about the rod 40. A coiled spring (not shown) preferably extends about the rod 40 within the roller 34 and connects the rod 40 and one of the idler bearings. The coiled spring is preloaded to bias the roller 34 toward a retracted position with the flexible awning 30 rolled thereon. Such bias systems are well-known to persons having ordinary skill in the art and is not specifically disclosed herein. Mounted in this manner, the rod 44 defines a collinear support and rotational axis for the roller 34.

The ends of the rod 40 are supported by the support arms 36. The support arms 36 are sized and shaped such that the roller 34 is located near the side wall 16 and at least partially above the roof 20. The lower end of each support arm 36 is mounted to the side wall 16 of the slide-out room 14 with a bracket 44. The brackets are secured to the side wall 16 with suitable fasteners 46.

The automatic locking mechanism 38 includes a lock disk 48 and a lock arm 50. The lock disk 48 has a plurality of circumferentially spaced-apart teeth 52 about the periphery thereof. The teeth 52 form a plurality of circumferentially spaced-apart and radially extending stops or abutments 54. The lock disk 48 has a central opening for passage of the rod 42 therethrough and is positioned between the end cap 42 of the roller 34 and the support arm 36. The lock disk 48 is connected to and rotates with the roller 34 about the rod 40. The lock disk is preferably integral with an outer surface of one of the end caps 42. Alternatively, the lock disk 48 can be a separate component attached to one of the end caps 42.

The first end of the lock arm 50 forms a locking member 56 sized and shaped for cooperating with the lock disk 48 to prevent or block rotation of the lock disk 48. The locking member 56 preferably prevents rotation of the lock disk 48 in both directions but alternatively could only prevent rotation in only the clockwise direction (as viewed in FIG. 3) which is the direction which unwinds the flexible awning 30.

The second end of the lock arm 50 is provided with an adjustable bumper 58. The adjustable bumper 58 is adapted so that the length of the adjustable bumper 58, and therefore the length of the lock arm 50, can be adjusted. In the illustrated embodiment, the adjustable bumper 58 includes a threaded shaft 60 which cooperates with a threaded opening in the second end of the lock arm 50 and a jam nut 62. The adjustable bumper 58 also includes a bumper member 64 attached to the end of the threaded shaft 60. The bumper member 64 is made of rubber or other suitable material for engaging the side wall 22 of the recreational vehicle 12.

The lock arm 50 is pivotally attached to the upper end of one of the support arms 36 with a shaft member 66 so that the lock arm 50 is pivotable relative to the support arm 36 and the lock disk 48. In the illustrated embodiment, the lock arm 50 extends above the lock disk 48 between the roller 34 and the support arm 36. The lock arm 50 is pivotal between a first or locked position (best shown in FIG. 3) and a second or unlocked position (best shown in FIG. 2). In the locked position, the lock member 56 of the lock arm 50 is engaging the lock disk 48, that is the lock member 56 is positioned between two teeth 52 of the lock disk 48, to prevent rotation of the lock disk 48. In the unlocked position, the lock member 56 is disengaged from the lock disk 48, that is the lock member 56 is spaced away from the teeth 52 of the lock disk 48, to allow rotation of the lock disk 48.

The lock arm 50 is provided with a bias member 68 which urges the lock arm 50 to the unlocked position. The bias member 68 of the illustrated embodiment is a helical coil spring connected between the lock arm 50 and the support arm 36. It is noted, however, that the bias member 68 can be in other suitable forms such as, for example, a leaf spring.

As best shown in FIG. 3, the bumper member 64 of the adjustable bumper 58 is engaging the side wall 22 of the recreational vehicle 12 when the slide-out room 14 is in the retracted position to hold the lock arm 50 in the locked position against the urging of the bias member 68. With the lock arm 50 in the locked position, rotation of the roller 34 is prevented because the lock member 56 of the lock arm 50 engages the abutments 54 of the lock disk teeth 52.

As the slide-out room 14 of the recreational vehicle 12 is moved out of the retracted position to the extended position, a space is created between the bumper member 64 and the side wall 22 of the recreational vehicle 12. This space allows the bias member 68 to pivot the lock arm 50 to the unlocked position (best shown in FIG. 2). With the lock arm 50 in the unlocked position, the roller 34 is free to rotate and unwind the flexible awning 30 as the slide-out room 14 moves out to the extended position.

When the slide-out room 14 is moved from the extended position to the retracted position, the lock arm 50 remains in the unlocked position so that the roller 34 is free to rotate and wind the flexible awning 30 thereon until the bumper member 64 contacts the side wall 22 of the recreational vehicle 12. When the bumper member 64 contacts the side wall 22, continued movement of the slide-out room 12 pivots the lock arm 50 to the locked position. With the lock arm 50 in the locked position, the lock arm 50 blocks rotation of the roller 34 as described above so that the flexible awning 30 cannot billow, and possibly unwind from the roller 34, during transportation of the recreational vehicle 12. It is noted from the above description that the locking mechanism 38 of the awning assembly 10 automatically locks and unlocks without any special operations or manipulations by the operator. It is simply the position of the slide-out room 14 which determines whether the locking mechanism 38 is locked or unlocked. It is also noted that the adjustable bumper 58 is adjusted to the appropriate length so that the lock arm 50 is pivoted to the locked position when the slide-out room 14 arrives at the retracted position and is pivoted to the unlocked position when the slide-out room 14 moves away from the retracted position.

FIG. 4 illustrates a retractable awning assembly 70 in accordance with a second embodiment of the present invention. Except for a locking mechanism 72, the awning assembly 70 is generally the same as the awning assembly 10 described with reference to FIGS. 1–3. Therefore like references numbers are used in FIG. 4 for like structure.

The locking mechanism 72 includes a lock arm 74 and a bumper block 76. The lock arm 74 is secured to the end cap 42 for rotation therewith so that the lock arm 74 rotates with the roller 34. The lock arm 74 circumferentially extends over a portion of the periphery of the end cap 42 and then radially extends from the end cap 42. The inner end of the lock arm 74, at the circumferentially extending portion, is attached to the end cap 42 with suitable fasteners 78 such as, for example the illustrated rivets. Alternately, the lock arm 74 can be attached directly to the roller 34 or can be integrally formed with the end cap 42. The outer end of the lock arm includes a bumper member 80. The bumper member 80 is made of rubber or other suitable material for engaging the bumper block 76.

The bumper block 76 is generally rectangularly-shaped and is secured to the side wall 22 of the recreational vehicle 12. The bumper block 76 is attached to the side wall 22 with suitable fasteners 82 such as, for example the illustrated screws. The bumper block 76 is made of aluminum or other suitable material for engaging the bumper member 80 of the lock arm 74. As best shown in FIG. 3, the bumper member 80 has a width which extends from the side wall 22 for a distance which blocks or engages the bumper member 80 of the lock arm when the slide-out room 14 is in the retracted position. Advantageously, an appropriately sized bumper block 76 can be selected from a group of bumper blocks having different sizes so that the locking mechanism 72 will function properly.

As best shown in FIG. 4, the bumper member 80 of the lock arm 74 is engaging the outer surface of the bumper block 76 when the slide-out room 14 is in the retracted position. With the lock arm 74 in this position, clockwise rotation (as viewed in FIG. 4) of the roller 34 is prevented because the bumper block 76 is blocking the lock arm 74.

As the slide-out room 14 of the recreational vehicle 12 is moved out of the retracted position to the extended position, a space is created between the bumper member 80 of the lock arm 74 and the bumper block 76 on the side wall 22 of the recreational vehicle 12. This space allows the lock arm 74 to freely rotate in the clockwise direction (as viewed in FIG. 4) so that the roller 34 is free to rotate and unwind the flexible awning 30 as the slide-out room 14 moves out to the extended position.

When the slide-out room 14 is moved from the extended position to the retracted position, the lock arm 74 and the roller 34 are free to rotate and wind the flexible awning 30 on the roller 34 until the bumper member 80 of the lock arm 74 contacts the bumper block 76 on side wall 22 of the recreational vehicle 12. When the bumper member 64 contacts the bumper block 76, the lock arm 72 blocks further clockwise (as viewed in FIG. 4) rotation of the roller 34 as described above. With the lock arm 74 in this position, the flexible awning 30 cannot billow, and possibly unwind from the roller 34, during transportation of the recreational vehicle 12. It is noted from the above description that the locking mechanism 70 of the awning assembly 70 according to the second embodiment of the present invention also automatically locks and unlocks without any special operations or manipulations by the operator. It is simply the position of the slide-out room 14 which determines whether the locking mechanism 72 is locked or unlocked. It is also noted that an appropriately sized bumper block 76 is selected so that the lock arm 74 is blocked by the bumper block 76 when the slide-out room 14 arrives at the retracted position and is not blocked by the bumper block 76 when the slide-out room 14 moves away from the retracted position.

Although particular embodiments of the invention have been described in detail, it will be understood that the invention is not limited correspondingly in scope, but includes all changes and modifications coming within the spirit and terms of the claims appended hereto.

What is claimed is:

1. A retractable awning for elongated vehicles transported on roads providing an interior enclosed at least in part by a side wall, a retractable slide-out in the side wall moveable from a retracted position in which the slide-out provides a side wall substantially co-planar to the vehicle side wall and an extended position in which the slide-out projects laterally from the vehicle side wall and the slide-out side wall is spaced laterally from the vehicle side wall, said awning comprising:

a roller having ends;

a pair of support arms rotatably supporting said ends of said roller, each support arm including a support bracket adapted to be mounted to the side wall of the slide-out;

a flexible awning having an inner edge adapted to be mounted on the vehicle side wall above the slide-out and an outer edge connected to the roller; and a locking mechanism including a moveable lock arm automatically operated by retraction of the roller to block rotation of said roller in at least one direction when the slide-out is in the retracted position.

2. A retractable awning as set forth in claim 1, wherein said lock arm is pivotable between a locked position in which said lock arm blocks rotation of said roller and an unlocked position in which said lock arm allows rotation of said roller.

3. A retractable awning as set forth in claim 1, wherein said locking mechanism includes a lock disk connected to said roller and rotatable with said roller, said lock arm engageable with said lock disk to block rotation of said lock disk and said roller.

4. A retractable awning as set forth in claim 3, wherein said lock arm is pivotally attached to one of said support arms and is pivotable between a locked position in which said lock arm engages said lock disk to block rotation of said lock disk and said roller and an unlocked position in which said lock arm is disengaged from said lock disk to allow rotation of said lock disk and said roller.

5. A retractable awning as set forth in claim 3, wherein said lock disk is integral with an end cap of said roller, said end cap closing an open end of said roller.

6. A retractable awning as set forth in claim 3, wherein said lock disk has teeth forming abutments and said lock arm has a locking member engageable with said abutments when said lock arm is in said locking position to block rotation of said lock disk and said roller.

7. A retractable awning as set forth in claim 2, wherein said locking mechanism includes a bias member which urges said lock arm to said unlocked position.

8. A retractable awning as set forth in claim 7, wherein said bias member is a helical coil spring.

9. A retractable awning as set forth in claim 2, wherein said lock arm includes a bumper adapted to engage said vehicle side wall and pivot said lock arm to said locking position.

10. A retractable awning as set forth in claim 9, wherein said bumper member is adjustable to change a length of said lock arm.

11. A retractable awning as set forth in claim 1, wherein said lock arm is connected to said roller and rotatable therewith.

12. A retractable awning as set forth in claim 11, wherein said lock mechanism includes a bumper block adapted to be mounted to the vehicle side wall and block rotation of said lock arm when the slide-out is in the retracted position.

13. A retractable awning as set forth in claim 12, wherein said lock arm includes a rubber bumper member adapted to engage said bumper block.

14. An elongated vehicle comprising:

a housing having an interior enclosed at least in part by a side wall;

a slide-out open to said interior and moveable relative to said side wall and said slide-out is substantially co-planar with said vehicle side wall and said slide-out projects into said interior, and an extended position, in which said slide-out slide wall is spaced from said vehicle side wall, said slide-out increasing a width of said interior; and a retractable awning assembly including a roller, a pair of support arms rotatably supporting said roller, each support arm having a support bracket mounted to said side wall of said slide-out, a flexible awning having an inner edge mounted on said vehicle side wall above said slide-out and an outer edge connected to said roller, and a locking mechanism having a moveable lock arm automatically operated by retraction of the roller to block rotation of said roller in at least one direction when said slide-out is in said retracted position.

15. A retractable awning as set forth in claim 14, wherein said lock arm is pivotable between a locked position in which said lock arm blocks rotation of said roller and an unlocked position in which said lock arm allows rotation of said roller.

16. A retractable awning as set forth in claim 14, wherein said locking mechanism includes a locking disk connected to said roller and rotatable with said roller, said lock arm engageable with said lock disk to block rotation of said lock disk and said roller.

17. A retractable awning as set forth in claim 15, wherein said locking mechanism includes a bias member which urges said lock arm to said unlocked position.

18. A retractable awning as set forth in claim 14, wherein said lock arm is connected to said roller and rotatable therewith.

19. A retractable awning as set forth in claim 18, wherein said lock mechanism includes a bumper block adapted to be mounted to the vehicle side wall and block rotation of said lock arm when the slide-out is in the retracted position.

20. A retractable awning for elongated vehicles transported on roads providing an interior enclosed at least in part by a side wall, a retractable slide-out in the side wall moveable from a retracted position in which the slide-out provides a side wall substantially co-planar to the vehicle side wall and an extended position in which the slide-out projects laterally from the vehicle side wall and the slide-out side wall is spaced laterally from the vehicle side wall, said awning comprising:

a roller having ends;

a pair of support arms rotatably supporting said ends of said roller, each support arm including a support bracket adapted to be mounted to the side wall of the slide-out;

a flexible awning having an inner edge adapted to be mounted on the vehicle side wall above the slide-out and an outer edge connected to the roller; and a locking mechanism including a lock arm adapted to automatically block rotation of said roller in at least one direction when the slide-out is in the retracted position, wherein said lock arm is pivotable between a locked position in which said lock arm blocks rotation of said roller and an unlocked position in which said lock arm allows rotation said roller, and said lock arm includes a bumper adapted to engage said vehicle side wall and pivot said lock arm to said locking position.

* * * * *